June 11, 1963  R. LOTZGESELL  3,092,911
TARGET TRACKING INSTRUMENT
Filed Aug. 12, 1960  3 Sheets-Sheet 1

INVENTOR
Rudolf LOTZGESELL

INVENTOR
Rudolf LOTZGESELL

United States Patent Office 3,092,911
Patented June 11, 1963

3,092,911
TARGET TRACKING INSTRUMENT
Rudolf Lotzgesell, Berlin-Mariendorf, Germany, assignor to Continental Elektroindustrie A.G., Askania-Werke, Berlin-Mariendorf, Germany, a corporation of Germany
Filed Aug. 12, 1960, Ser. No. 49,216
Claims priority, application Germany Aug. 12, 1959
1 Claim. (Cl. 33—46)

The present invention deals with the construction of a target tracking instrument, especially of the kind known as a recording theodolite. The invention particularly relates to a mounting and bearing arrangement for target tracking devices in which an electrical transducer is oriented partly on the stationary portion of the instrument and partly on the portion which rotates with respect to the latter, the transducer consisting of two functionally cooperating individual parts, which for the desired transducer action are mounted in a manner such that they can rotate with respect to each other, the relative rotational orientation representing a measure of the rotation of the movable instrument portion with respect to the stationary portion.

In the past one has measured the orientation of the shaft of the theodolite telescope by circular scales coupled to the two axes of rotation of the telescope. The momentary image of the reading points of the circular scales was recorded photographically together with a reading index upon the recording film of the theodolite camera. But recently, in order to speed up the evaluation of the measurements of the recording theodolite, there have been devised, in addition to or independently of, the photographic recording of the readings of the circular scale(s), measuring facilities which allow more continuous measurement of the telescope position by providing digital measuring values which can be evaluated immediately and are continuously available. The commonly known circular scales are not well suited for automatic evaluation of reading, and therefore transducers have been suggested which furnish an indication of the position of the shafts of the target instrument continuously in the form of analog or digital electric signals, or equivalent indication of the position of the mechanical parts.

A common characteristic of the measuring means mentioned is that they consist of two individual parts which cooperate functionally, one of which is rigidly secured to the portion which bears the target tracking means of the target instrument, and the other of which is rigidly secured to the corresponding mounting or position-reference portion. One might have, for example, two windings or coils, which can be rotated with respect to each other, of an inductive transducer. In other cases two plates of a special condenser face each other, the plates being rotatable with respect to each other. A device of this kind, which has been employed in recording theodolites, has been described, for example, in Control Engineering of April 1959, pages 126 to 128. The arrangement described there and others indicate the rotational position of the part which bears the target tracking device as an alternating voltage with a phase which is proportional to the angle of rotation. The phase of this alternating voltage is compared with the phase of a reference alternating voltage and is indicated or registered digitally.

The accuracy of these and other similar means of measurement is based upon the assumption that the individual parts have an exactly defined position with respect to each other except for relative rotation. In the application of the condenser system mentioned above, the plates of the special condenser, which face each other across a small air gap (0.2±0.002 mm.), must be carried by the theodolite in such a manner that they can be turned with respect to each other, but even very small eccentricities of both plates must be avoided, so as to avoid undesired modulation of the signal of the transducer.

One could do this with the theodolite mounting constructions known to the prior art only if one took very great care in production of the parts. In present constructions, one of the two condenser plates is rigidly connected with the part bearing the target tracking means, and the second plate is rigidly connected with the supporting part of the theodolite. It is found that the condenser plates of such an arrangement are properly adjustable, and maintained in adjustment, only with great difficulty and further that the installation of the part bearing the target tracking means upon the stationary support must be done with the greatest of care.

According to the present invention these difficulties are avoided by virtue of a construction of target tracking instruments, especially recording theodolites, in which the measuring part rotationally affixed to one of the portions of the main device is supported in position with respect to the measuring part rotationally affixed to the other portion by a bearing independent of the bearing which mounts the two main portions for relative rotation, the rotational affixation of the part supported on the second bearing being made by a coupling which is rigid in the direction of relative rotation, but readily yielding in all other directions of relative motion, so that the relative positioning of the two measuring parts is fixed in all directions other than the rotational direction by the second bearing.

Preferred embodiments of the present invention shall now be described, being illustrated in the drawing, in which.

Figure 1:
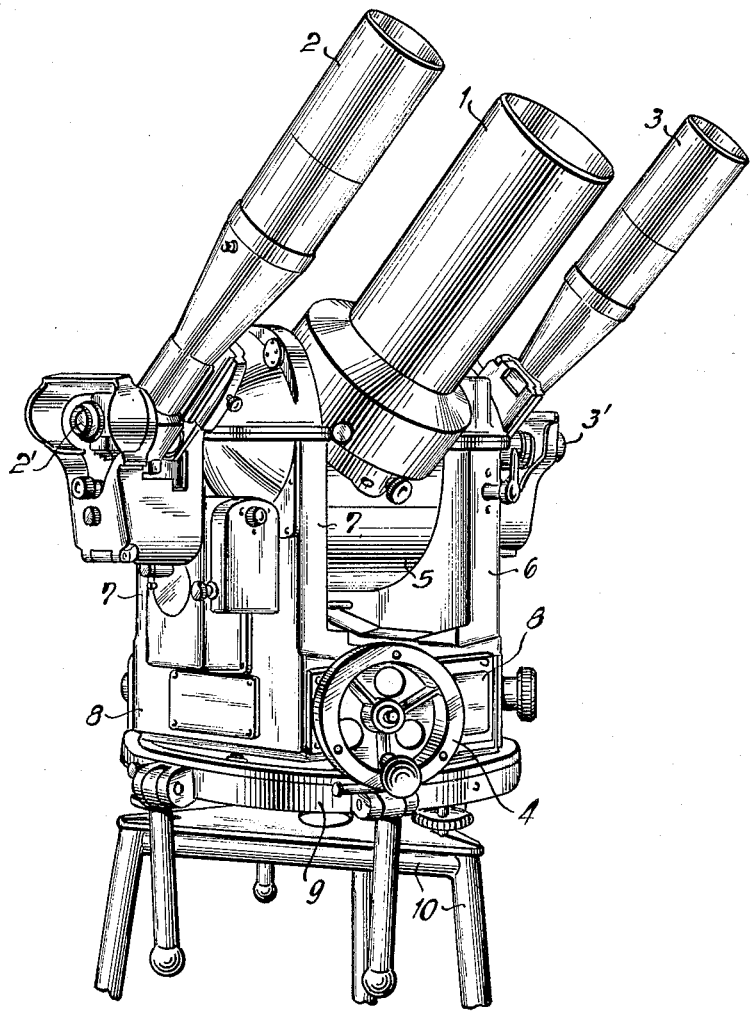
FIGURE 1 shows a view in perspective of a recording theodolite.

In FIGURE 1, 1 designates the telescope of a recording theodolite, with which are coordinated two scanning telescopes 2 and 3. The telescope 1 and the two scanning telescopes are mounted so that they revolve around a horizontal axis of the instrument. The numerals 2' and 3' designate the oculars of the scanning telescopes 2 and 3, which make possible the adjustment of the telescope 1 by the operating crew assigned for this purpose by operation of levers 4 (only one being visible) for azimuth and elevation actuation to maintain the target to be tracked in the point of intersection of crossed threads in the scanning telescopes 2 and 3.

The telescope 1 is coupled to a recording camera within a housing 5. The housing 5 is rigidly connected to telescope 1 and is movable together with it around the horizontal axle of the instrument, which supports the elements thus far described and is journalled in uprights 6 and 7 which thus carry the target tracking means. Uprights 6 and 7 extend upward from a substructure 8 of the instrument, which is mounted upon a support portion 9, the substructure 8 rotating about a vertical axis upon the support portion 9. The entire instrument is borne on a tripod-like stand 10. It will be understood that the showing of FIGURE 1 is primarily to aid in understanding of the purpose or environment of the structure shown in the other figures, now to be described.

Figure 2:
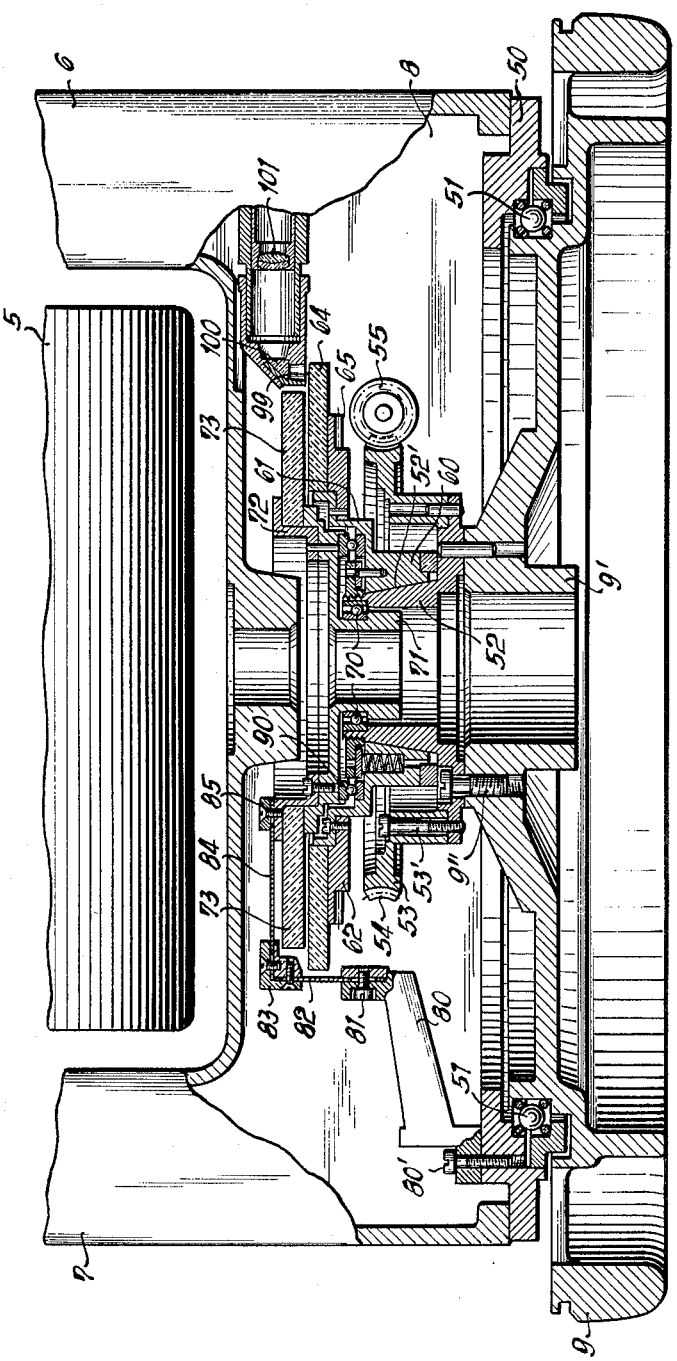
FIGURE 2 shows in section a typical embodiment of the invention as incorporated in such a theodolite, non-essential details being omitted.

As shown in FIGURE 2, the substructure 8 of the instrument rests upon a base plate 50. The base plate 50 is supported upon a ball bearing 51, which extends annularly around the vertical center of rotation of the instrument, so that the entire assembly supported by it can be rotated upon support portion 9 around the vertical axis of rotation.

The support portion 9, which remains stationary upon rotation of the instrument, has at its center a hollow boss 9' protruding upward through a central opening in the base plate 50, the boss supporting, and having secured thereto by screws 9", a support bushing 52 having a conical outer surface 52'. The bushing 52 is fastened by screws 53' to annular ring 53 which has formed on its outer circumference 54 a worm gear, which meshes with a worm spindle 55. The spindle or worm 55 is connected to driving motors (not shown in the drawings) which are actuated by the azimuth control lever of the theodolite.

The ring 53 is stationary, so that by the interaction of the spindle 55 (mounted in this embodiment on plate 50 by means not shown) and the gear 54, the entire assembly is rotated.

The bushing 52, which carries inner ball bearing 70, bears on its conically shaped outer surface 52' the interiorly conical base 60 of a mounting 61, which carries outer ball bearing 90, and also supports a ring 62, upon the upper surface of which rests an annular glass transducer part 64, which is concentric with the axis of rotation, and which forms the stationary part of the electric transducer or measuring means. The ring 62 has formed on its under surface a gear 65, which meshes with a worm (not shown). By turning of this worm the mounting base 60 and thus the transducer part 64 may be rotationally adjusted with respect to bushing 52 to standardize the rotary position of the stationary transducer part 64. In operation of the instrument, however, the part 64 will of course remain stationary.

Upon the ball bearings 70 and 90 a support ring 72 is rotatably supported. The ring 72 forms a holder for the rotary part 73 of the electric transducer affixed to support plate 50 by a coupling to be described.

The base plate 50 supports by means of screws 80' an angular support arm 80, to which screws 81 secure the lower end of a thin vertical spring membrane or resilient plate 82. The spring membrane 82 itself is adjustably attached at its upper end to a clamp 83, which also is adjustably clamped to the outer end of a horizontally extending second spring membrane 84. The inner end of spring membrane 84 is attached to ring 72 by screws 85, so that upon turning of the rotatable portion of the tracking assembly, the coupling described drives the transducer part 72 whereas the other part 64 of the transducer remains rotationally stationary. However the yielding construction of the coupling in all directions other than rotation permits the relative positioning of the transducer parts as regards parallelism, concentricity, etc. to be independent of the relatively coarse main support bearing 57, this being governed by the small-load relatively accurate bearings 70 and 90.

The transducer in the example described is constructed in the manner of known capacitive transducers, the rotor as well as the stator of the arrangement having metallic patterns on their facing surfaces to form a system of variable capacitive coupling such that upon the feeding of, e.g., two high-frequency alternating voltages which have a phase displacement with respect to each other, into the stator 64, there appears at the rotor 73 thereof an alternating voltage, the phase angle of which is proportional to the relative turning of rotor and stator. By a measurement of the phase angle of the voltage picked off the rotor one may determine the position of the rotatable instrument parts with respect to the stationary portion. The stator 64 of the transducer carries in addition at its external circumference 99 an ordinary, optical circular scale, the point of reading of which is reproduced, by means of lenses 100 and 101, in the field of vision of the recording camera within housing 5, along with each picture of the tracked target taken. The lenses 100, 101 are mounted together with their associated optical parts on the rotary assembly.

The described type of support and positioning of the electric transducer system 64, 73 affords a superior mutual orientation of the two transducer parts with respect to each other, for the reasons stated, and in addition, in contrast to previous devices in which the rotary part of the transducer is fixedly attached to the rotary portion of the main assembly, the advantage is presented that upon removal of the uprights 6 and 7 from the base plate 50, the transducer parts 64, 73 become freely accessible in their operating position.

If an electric transducer 64, 73 is to function properly, the force transmission between the two parts of the construction which are turned with respect to each other must occur completely without play and without stresses. This aim is obtained by the illustrated construction of the membrane-coupling. The two membranes 82 and 84 are, as previously indicated, perpendicular to each other and are connected to each other by the clamp 83, which affords easy adjusting of the coupling to prevent loading of the bearings 70 and 90 by the coupling to the main assembly. The horizontal membrane 84 and the vertical membrane 82 may be provided with recesses and cut-outs of suitable shapes and positions, so as to further avoid stresses.

Figure 3:
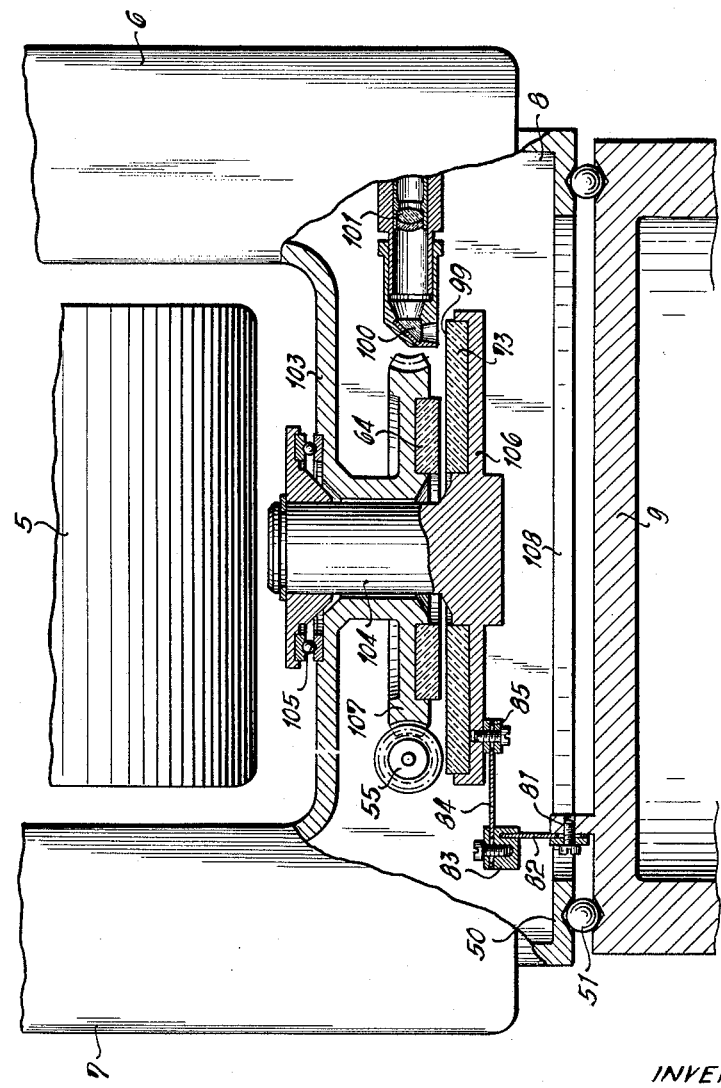
FIGURE 3 shows another example of a construction according to the invention.

In the embodiment of FIGURE 2 the two parts 64 and 73 of the transducer are supported upon the stationary support 9 of the theodolite. FIGURE 3 shows a mounting arrangement in which both parts are supported by movable parts of the theodolite. In FIGURE 3, the reference numerals 6 and 7 again designate the uprights which bear the target tracking means of the theodolite, which are supported upon the base plate 50. The interconnecting web 103, which connects the two uprights, supports a ball bearing 105, upon which a shaft 104, which passes through a central aperture of the web 103, is supported. The shaft 104 supports a holder 106 for the transducer part 73, and a boss formed on web 103 surrounding the shaft has a flange 107, which holds the transducer part 64. The coupling 81, 82, 83, 84, 85, constructed as previously described, passes through an opening 108 in the base plate 50 and connects holder 106 with the stationary part 9 of the theodolite.

In this arrangement, the transducer part 73, in contrast to the arrangement of FIGURE 2, forms the stator of the transducer, i.e., upon the turning of the supports 6 and 7 around the vertical axis of rotation upon the ball bearing 51, the transducer part 73 remains stationary, and the transducer part 64 rotates with uprights 6 and 7 around the vertical axis.

It is of course possible to equip the horizontal axis of the instrument in the same manner with mounting parts for the transducing device, of the general construction described. Many modifications will readily occur to one skilled in the art, which fall within the purview of the invention. Accordingly, the invention shall be deemed to be limited and defined only by the appended claim.

What is claimed is:

In a target tracking instrument having a reference portion and a rotating portion to form a main assembly and a pair of circular plates, closely spaced and parallel and varying in coupling with relative rotation to produce an electrical signal indicative of relative rotational positions of the two portions of the main assembly, each plate being coupled one to each of the portions and concentric with the axis of rotation, the improved construction wherein the rotating portion of the main assembly is supported on the reference portion by an annular bearing and one of the plates is rotatably supported with respect to the second by an independent bearing, the second plate being mounted in fixed position on one of the portions of the main assembly, and a coupling affixing said one plate to the other portion of the main assembly for maintenance of rotational position correspondence therebetween, said coupling comprising a thin spring plate parallel with the axis of rotation and a thin spring plate perpendicular to the axis of rotation and a clamp adjustably joining the adjacent ends of the plates to permit adjustment of the coupling to prevent stress on the holding means, the coupling being more yielding in other directions than in the direction of rotation about the axis, whereby the reliance of relative plate positioning upon maintenance of relative positioning of the portions of the main assembly in directions other than that of rotation is reduced without corresponding reduction of accuracy of plate orientation as regards rotational position.

References Cited in the file of this patent

UNITED STATES PATENTS

| | | |
|---|---|---|
| 2,617,722 | Amberg | Feb. 10, 1953 |
| 2,903,867 | Moody | Sept. 15, 1959 |
| 2,930,033 | Webb | Mar. 22, 1960 |
| 2,940,171 | Steele | June 14, 1960 |

FOREIGN PATENTS

| | | |
|---|---|---|
| 690,427 | Germany | Apr. 25, 1940 |

OTHER REFERENCES

Burgess: "Speeding Missile Trajectory Computation," April 1959, Control Engineering, vol. 6, No. 4, pages 126–128, McGraw-Hill Publishing Co., New York, N.Y. Copy in Scientific Library.